June 17, 1924.  1,498,425

G. COTTON

COMBINATION MAT AND LUGGAGE HOLDER FOR MOTOR VEHICLES

Filed Oct. 13, 1922  2 Sheets-Sheet 1

Inventor
George Cotton
By Clarence O'Brien
Attorney

H. Berman
H. A. LaBlair
Witnesses

June 17, 1924.                                                    1,498,425
G. COTTON
COMBINATION MAT AND LUGGAGE HOLDER FOR MOTOR VEHICLES
Filed Oct. 13, 1922          2 Sheets-Sheet 2
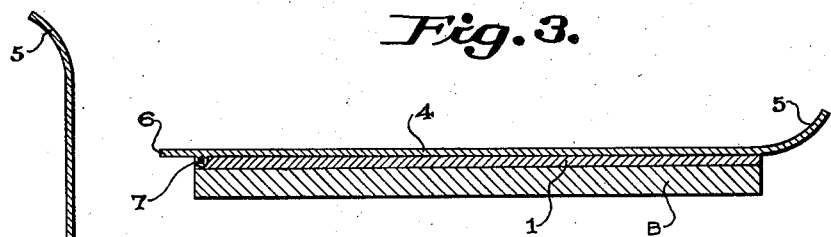
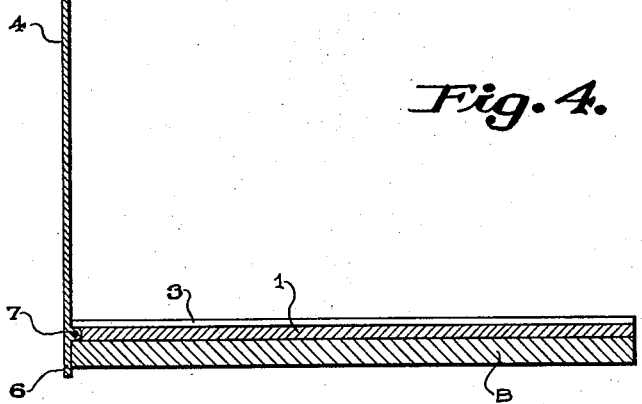
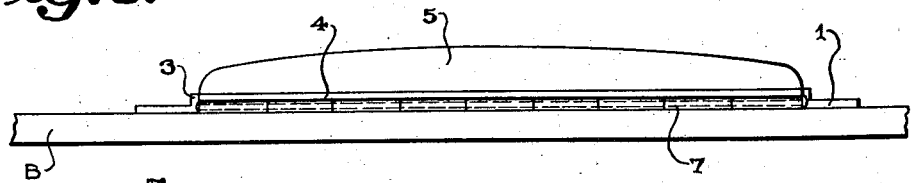
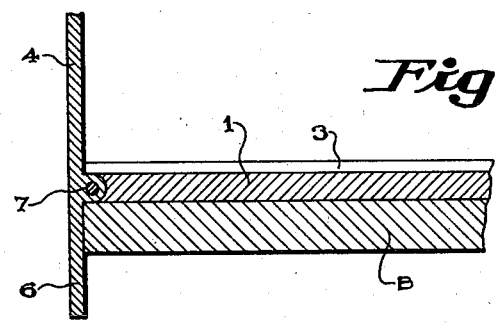
Inventor
George Cotton
By Clarence A. O'Brien
Attorney
H. Berman
H. A. LaClair
Witnesses Patented June 17, 1924.

1,498,425

UNITED STATES PATENT OFFICE.

GEORGE COTTON, OF PHILADELPHIA, PENNSYLVANIA.

COMBINATION MAT AND LUGGAGE HOLDER FOR MOTOR VEHICLES.

Application filed October 13, 1922. Serial No. 594,237.

*To all whom it may concern:*

Be it known that I, GEORGE COTTON, a citizen of the United States, residing at Philadelphia, in the county of Philadelphia and State of Pennsylvania, have invented new and useful Improvements in Combination Mats and Luggage Holders for Motor Vehicles, of which the following is a specification.

In carrying out the present invention it is my purpose to provide a combination mat and luggage holder for the running board of motor vehicles which may be readily applied to the running board and which may be swung to a position to form a mat when not in use as a luggage carrier, and which may be swung to position to form a luggage carrier when it is desired to store luggage on the running board of the vehicle.

It is also my purpose to provide a device of the class described which will embrace the desired features of simplicity, efficiency and durability, which may be manufactured and marketed at small cost and which will embody comparatively few parts, and these so arranged and corelated as to reduce the possibility of derangement to a minimum.

With the above recited objects in view, and others of a similar nature, the invention resides in the construction, combination and arrangement of parts set forth in and falling within the scope of the appended claims.

In the accompanying drawings:

Figure 3 is a cross sectional view through the device showing the same in position as a mat.

Figure 4 is a similar view showing the device in position as a luggage carrier.

Figure 5 is an edge view of the device applied to the running board.

Figure 6 is an enlarged fragmentary sectional view showing the device in its adjusted position.

Figure 1:
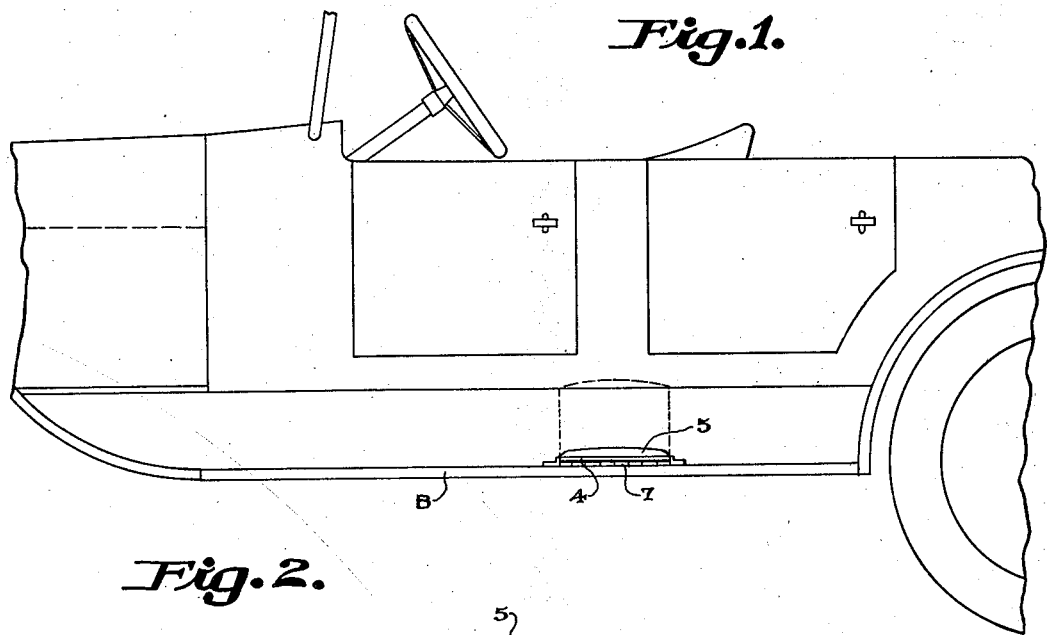
Figure 1 is a fragmentary side elevation of a motor vehicle showing my device applied thereto.
Figure 2:
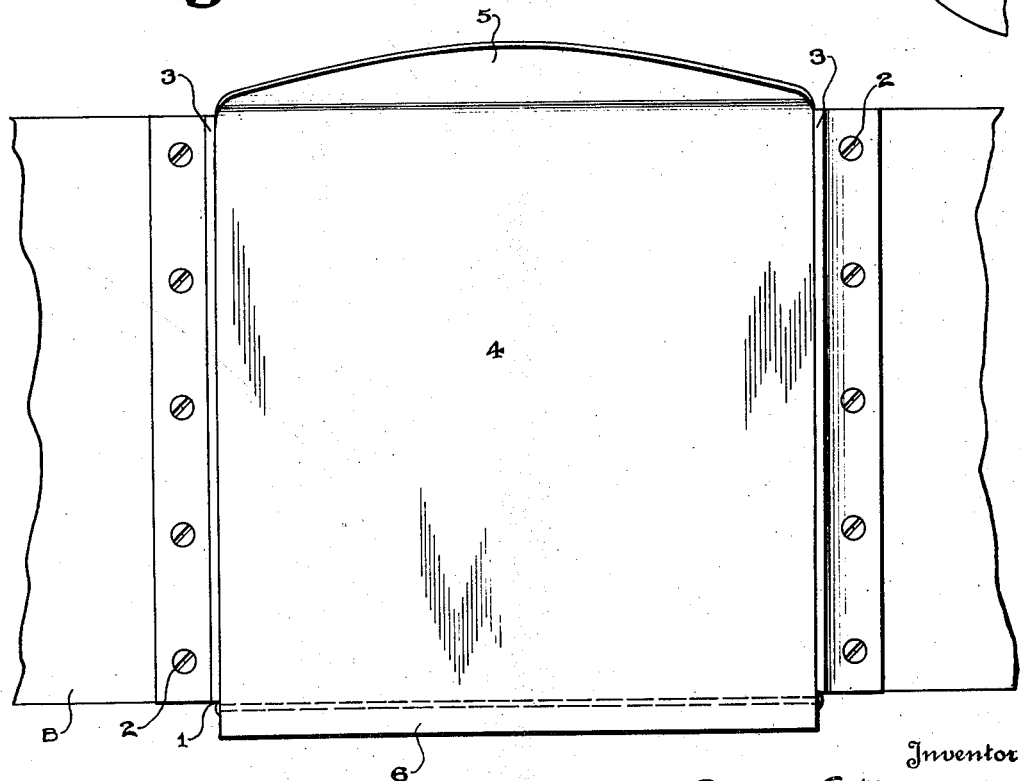
Figure 2 is a top plan view of the device applied to the running board.

Referring now to the drawings in detail, 1 designates a base plate of a width substantially equal to that of the running board B of the automobile and of suitable length. This base plate 1 is fastened by means of screws 2 or other fastening devices to the running board B, clearly shown in Figures 1 and 2 of the drawings. The fastening devices 2 are arranged adjacent to the end edges of the base plate. The base plate 1 on its upper surface inwardly of the end edges thereof is formed with upwardly extending flanges 3—3 that extend transversely of the running board of the motor vehicle. Superimposed upon the base plate 1 between the flanges 3—3 is a plate 4, which, when in face to face contact with the base plate, forms a mat, and the inner end of the plate 4 is bent upwardly, as at 5, to provide a guard, so as to prevent kicking of the body of the vehicle by those entering the same. The outer end of the plate 4 projects beyond the base plate 1, as at 6, so as to form a scraper surface by which dirt and other foreign matter may be removed from the shoes of those entering the vehicle.

The under side of the plate 4 inwardly of the extension 6 is hinged, as at 7, to the outer end of the base plate 1, so that the plate 4 may be swung upwardly to a vertical position, as shown in Figures 4 and 6 of the drawings. When swung upwardly to this position the extension 6 engages the outer edge of the running board, as shown in Figures 4 and 6, so as to act as a stop in order to limit the opening movement of the plate 4. In this position the plate 4 acts as a luggage holder, so that luggage may be placed upon the running board between the plate 4 and the body of the vehicle, thereby preventing such luggage from accidentally falling from the running board.

I have entered into a detailed description of the construction and relative arrangement of parts embraced in the present and preferred embodiment of my invention with a view to imparting a full, clear and exact understanding of the said embodiment. I do not desire, however, to be understood as confining myself to the said specific construction and relative arrangement of parts, inasmuch as in the future practice of my invention such changes or modifications may be made as fairly fall within the scope of my invention as defined by my appended claims.

Having thus described the invention, what is claimed as new, is:—

1. A combination mat and luggage holder including a base plate adapted to be secured to the running-board of an automobile, and a plate superposed on said base plate and pivotally connected to the outer edge of said base plate, said plate extending outwardly beyond the pivot, whereby the plate forms a mat when superposed on the base and the outer end forms a stop to limit the pivotal movement of the plate relative to the base when moved upwardly to form a luggage holder.

2. A combination mat and luggage holder including a base adapted to be secured to the running board of an automobile, a plate superposed upon said base to form a mat and pivotally connected with the outer edge of said base, said plate having the outer end extending beyond the edge of the base, and the inner end formed with an extension in angular relation to the main portion of the plates, whereby the plate may be moved on the pivot from its superposed relation with the base to form a luggage holder, said outer extending portion of the plate forming a stop to limit the pivotal movement of the plate on the base, and further inner angular extension forming a handle through which the plate may be moved.

3. A combination mat and luggage holder including a base adapted to be secured to the running board of an automobile, said base being formed with a plate receiving recess, a plate mounted in said recess having the upper surface lying flush with the upper surface of the base, said plate having a hinge connection with the outer edge of the base and the outer end of said plate extending beyond the hinge at the base, whereby when the plate is fitting in said recess in the base it is adapted to form a mat, and is adapted to be moved on the hinge relative to said base for extension in an upward position to form a luggage holder, the outer end of the plate being adapted for co-operation with the outer edge of the base and running board to form a stop for limiting the pivotal movement of said plate on the hinge.

4. A combination mat and luggage holder including a base plate adapted to be secured to the running board of an automobile, said base having a plate receiving recess, and a plate member mounted in said recess adapted to lie flush with the base, and having a hinge connection with the outer edge of the base, the outer end of the plate extending beyond said hinge connection and base, and the inner end of the plate being formed with an angular extension forming a handle, whereby the plate forms a mat when seated in the recess of the base, and said handle extension may be engaged for moving the plate on the hinge to extend the same at substantially right angles to the base to form a luggage holder, the outer end of the plate co-operating with the base and running board to form a stop to limit the movement of the plate on the hinge.

In testimony whereof I affix my signature.

GEORGE COTTON.